United States Patent
Kurupacheril et al.

(10) Patent No.: US 9,094,822 B2
(45) Date of Patent: Jul. 28, 2015

(54) SEAMLESS TELEPHONE LOGIN

(71) Applicant: Futurewei Technologies, Inc., Plano, TX (US)

(72) Inventors: Francis Kurupacheril, Cupertino, CA (US); Martin Leima, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 184 days.

(21) Appl. No.: 13/654,764

(22) Filed: Oct. 18, 2012

(65) Prior Publication Data

US 2014/0113589 A1 Apr. 24, 2014

(51) Int. Cl.
| | |
|---|---|
| *H04M 1/66* | (2006.01) |
| *H04M 1/68* | (2006.01) |
| *H04M 3/16* | (2006.01) |
| *H04W 12/06* | (2009.01) |
| *H04L 29/08* | (2006.01) |
| *H04M 1/247* | (2006.01) |
| *H04M 1/725* | (2006.01) |

(Continued)

(52) U.S. Cl.
CPC ............. *H04W 12/06* (2013.01); *H04L 67/306* (2013.01); *H04M 1/2471* (2013.01); *H04M 1/72563* (2013.01); *H04L 63/0861* (2013.01); *H04L 2463/082* (2013.01); *H04M 2250/04* (2013.01); *H04W 4/008* (2013.01)

(58) Field of Classification Search
CPC ......... H04W 4/00; H04W 4/008; H04W 4/12; H04W 8/00; H04W 12/00–12/12; H04W 76/02

USPC .............. 455/41.2–41.3, 410, 411, 418–420, 455/424, 554.1, 554.2; 380/270; 709/217–219, 248; 713/168, 185
See application file for complete search history.

(56) References Cited

U.S. PATENT DOCUMENTS

| | | | | |
|---|---|---|---|---|
| 5,657,388 | A | * | 8/1997 | Weiss ............................ 713/185 |
| 6,601,038 | B1 | * | 7/2003 | Kolls .......................... 705/14.23 |
| 6,874,037 | B1 | * | 3/2005 | Abram et al. ................. 709/248 |

(Continued)

FOREIGN PATENT DOCUMENTS

| | | |
|---|---|---|
| CN | 1673987 A | 9/2005 |
| CN | 102368750 A | 3/2012 |

(Continued)

OTHER PUBLICATIONS

"PandaeatsBamboo—A Tech Sharing Blog," http://pandaeatsbamboo.blogspot.com/, (last visited Aug. 27, 2012), 8 pages.

(Continued)

*Primary Examiner* — Steve D Agosta
(74) *Attorney, Agent, or Firm* — Conley Rose, P.C.; Grant Rodolph; Brandt D. Howell (57) ABSTRACT

An apparatus comprising a transmitter, a receiver, and a processor coupled to the transmitter and the receiver, wherein the apparatus comprises communication settings not associated with a user, and wherein the processor is configured to receive user information associated with the user, cause the user information to be transmitted via the transmitter to a profile server for authentication, receive user profile data associated with the user from the profile server, and update the communication settings to include the user profile data.

11 Claims, 6 Drawing Sheets

(51) Int. Cl.
*H04L 29/06* (2006.01)
*H04W 4/00* (2009.01)

(56) References Cited

U.S. PATENT DOCUMENTS

| | | | | |
|---|---|---|---|---|
| 7,848,746 | B2* | 12/2010 | Juels | 455/424 |
| 7,907,935 | B2* | 3/2011 | Le Saint et al. | 455/411 |
| 8,045,961 | B2* | 10/2011 | Ayed et al. | 455/411 |
| 8,627,075 | B2* | 1/2014 | Ikeda et al. | 713/168 |
| 8,706,083 | B2* | 4/2014 | Willis | 455/411 |
| 8,774,145 | B2* | 7/2014 | Lin et al. | 370/338 |
| 2002/0141586 | A1* | 10/2002 | Margalit et al. | 380/270 |
| 2008/0014867 | A1* | 1/2008 | Finn | 455/41.1 |
| 2011/0099248 | A1* | 4/2011 | Uchida | 709/218 |

FOREIGN PATENT DOCUMENTS

| | | |
|---|---|---|
| CN | 102427583 A | 4/2012 |
| EP | 2326047 A1 | 5/2011 |

OTHER PUBLICATIONS

"Windows Extension Mobility Manager (WEMM)," VSR2 Specialist Software Solutions, www.vsr2.com, downloaded from the Internet Aug. 27, 2012, 3 pages.

Xyloc®, Ensure Technologies™, www.ensuretech.com, downloaded from the Internet Aug. 27, 2012, 4 pages.

Foreign Communication From a Counterpart Application, PCT Application No. PCT/CN2013/085417, International Search Report dated Jan. 16, 2014, 6 pages.

Foreign Communication From a Counterpart Application, PCT Application No. PCT/CN2013/085417, Written Opinion dated Jan. 16, 2014, 4 pages.

* cited by examiner

SEAMLESS TELEPHONE LOGIN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern businesses may benefit from the use of shared workspaces to reduce real estate costs. For example, share workspaces may be ideal for temporary workers, part-time workers, shift workers, and/or floating workers that are required to move from location to location to perform their duties. However, workers may be required to spend time personalizing the working space prior to engaging in their assigned duties. Such time spent personalizing the space may reduce time spent on the assigned duties, may reduce overall productivity, and may result in reduced benefit from the use of the shared space.

SUMMARY

In one embodiment, the disclosure includes an apparatus comprising a transmitter, a receiver, and a processor coupled to the transmitter and the receiver, wherein the apparatus comprises communication settings not associated with a user, and wherein the processor is configured to receive user information associated with the user, cause the user information to be transmitted via the transmitter to a profile server for authentication, receive user profile data associated with the user from the profile server, and update the communication settings to include the user profile data.

In another embodiment, the disclosure includes a network component comprising a transmitter, a receiver, and a processor coupled to the transmitter and receiver and configured to receive, via the receiver, user information from a telephone that comprises communication settings that do not comprise any user profile data, obtain user profile data from a database, wherein the user profile data is associated with a user and retrieved based on the user information, and transmit, via the transmitter, the user profile data to the telephone, wherein the telephone updates communication settings to incorporate the user profile data.

In another embodiment, the disclosure includes a method comprising receiving, by a telephone, a radio frequency identification (RFID) signal from a user identifier (UI), wherein the RFID signal comprises a first username associated with a first user if the telephone is not configured for a second user, transmitting the first username to a profile server, and updating communication settings of the telephone based on a user profile received from the profile server in response to transmitting the first username.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a telephone that may obtain user profiles from a server. The telephone may be equipped with a sensor capable of receiving radio frequency identification (RFID) signals, for example by using a near field communication (NFC) protocol. A user may pass a RFID tag, such as an NFC tag, in close proximity to the sensor, which may cause the telephone to authenticate the user, obtain a user profile associated with the user, and update communication settings based on the user profile without the need for further user interaction. The RFID tag may be embedded in a user identifier (UI), which may comprise a mobile telephone, an identification badge, a tablet personal computer, personal digital assistant, or similar devices. Updating the communication settings may comprise receiving a telephone line assignment, speed dials, service links, incoming calls, voicemail, dial permissions, call forwards, call history, and/or extensible markup language (XML) applications that are associated with the user. The use of a UI for rapid login may allow a user to quickly personalize a workspace for increased productivity. In an embodiment, the telephone may be configured to require security data such as a personal identification number (PIN), password, or biometric data from the user as part of authentication for increased security.

Figure 1:
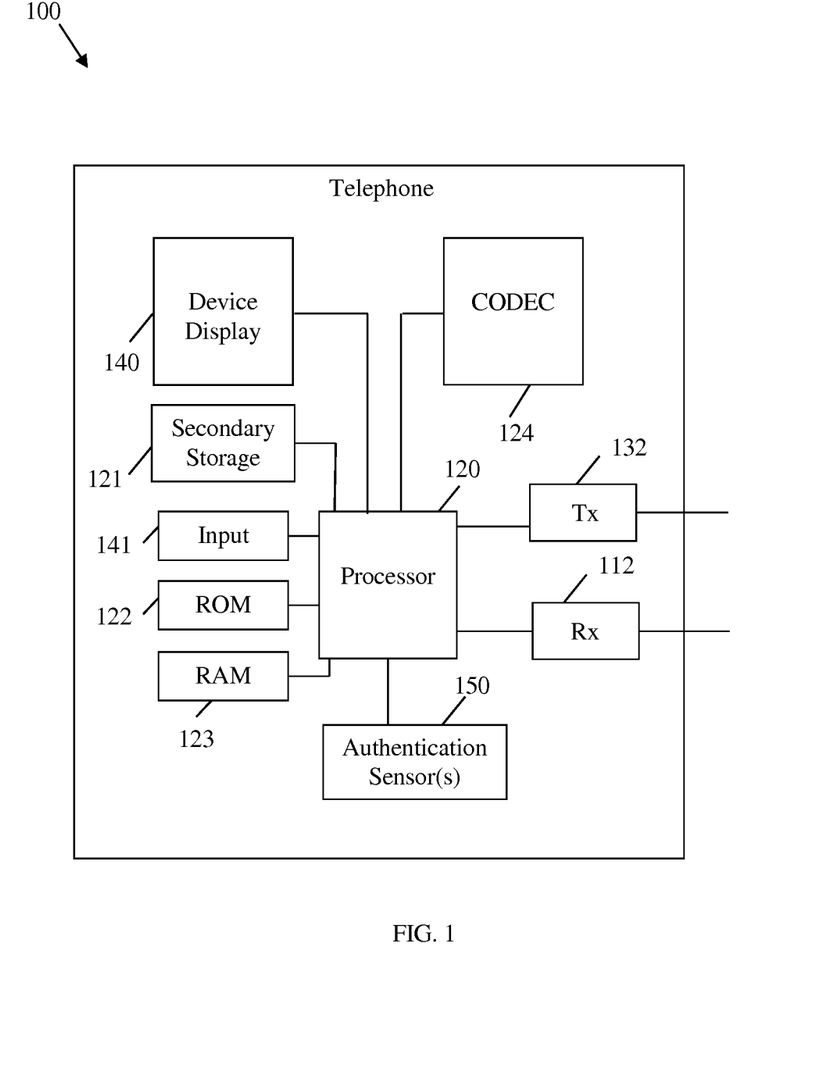
FIG. 1 is a schematic diagram of an embodiment of a telephone.

FIG. 1 is a schematic diagram of an embodiment of a telephone 100. Telephone 100 may comprise a two-way wired or wireless communication device having voice and data communication capabilities. For example, the telephone 100 may be an Internet Protocol (IP) telephone that converts received audio data from a user into communication packets, forwards the communication packets to a server for transport to another telephone though a network, receives communication packets comprising audio data from another telephone, and converts the received audio data into sound waves that can be heard by the user. The telephone 100 may transmit and receive user profile data and update communication settings based on the user profile data.

Telephone 100 may comprise a processor 120 (which may be referred to as a central processor unit or CPU) that is in communication with memory devices including secondary storage 121, read only memory (ROM) 122, and random access memory (RAM) 123. The processor 120 may be implemented as one or more CPU chips, one or more cores (e.g., a multi-core processor), or may be part of one or more application specific integrated circuits (ASICs) and/or digital signal processors (DSPs). The processor 120 may be configured to implement any of the schemes described herein, and may be implemented using hardware, software, firmware, or combinations thereof. The processor 120 may also comprise analog-to-digital converters (ADCs) and/or digital-to-analog converters (DACs) in some instances. In addition or in the alternative, the processor may comprise a coder-decoder (CODEC) 124 for compressing and decompressing voice and/or other audio signals. The CODEC 124 may be implemented in hardware or may be a software process operating on the processor 120.

The secondary storage 121 may be comprised of one or more solid state drives, disk drives, and/or tape drives and is used for non-volatile storage of data and as an over-flow data storage device if RAM 123 is not large enough to hold all working data. Secondary storage 121 may be used to store programs that are loaded into RAM 123 when such programs are selected for execution. The ROM 122 may be used to store instructions and perhaps data that are read during program execution. ROM 122 may be a non-volatile memory device may have a small memory capacity relative to the larger memory capacity of secondary storage 121. The RAM 123 may be used to store volatile data and perhaps to store instructions. Access to both ROM 122 and RAM 123 may be faster than to secondary storage 121.

Telephone 100 may comprise a receiver (Rx) 112, which may be configured for receiving data, packets, or frames from other components. The receiver 112 may be coupled to the processor 120, which may be configured to process the data and determine to which components the data is to be sent. The telephone 100 may also comprise a transmitter (Tx) 132 coupled to the processor 120 and configured for transmitting data, packets, or frames to other components. The receiver 112 and transmitter 132 may be coupled to a server via a wireless or wired connection and may transmit/receive data to/from the server.

The telephone 100 may also comprise a device display 140 coupled to the processor 120, for displaying output thereof to a user. The device display 120 may comprise a Light Emitting Diode (LED), Color Super Twisted Nematic (CSTN) display, a thin film transistor (TFT) display, a thin film diode (TFD) display, an organic light-emitting diode (OLED) display, an active-matrix OLED display, or any other display screen. The device display 140 may display in color or monochrome and may be equipped with a touch sensor based on resistive and/or capacitive technologies.

The telephone 100 may further comprise input devices 141, coupled to the processor 120, which may allow the user to input commands and/or authentication information to the telephone 100. In the case that the display device 140 comprises a touch sensor, the display device 140 may also be considered an input device 141. In addition to and/or in the alternative, an input device 141 may comprise a mouse, trackball, built-in keyboard, external keyboard, and/or any other device that a user may employ to interact with the telephone 100.

The telephone 100 may further comprise authentication sensors 150, coupled to the processor 120. The authentication sensors 150 may be configured to detect user biometric data for authentication purposes. Biometric data may be data that measures unique physical or behavioral characteristics as a means of verifying personal identity. For example, the authentication sensors 150 may comprise a retinal scanner, a fingerprint scanner, a deoxyribonucleic acid (DNA) scanner, a microphone configured for voiceprint analysis and/or other sensors configured to receive biometric identification information. The authentication sensors 150 may further comprise an RFID sensor, such as a NFC proximity reader, or other wireless signal proximity sensor configured to receive RFID signals from a corresponding RFID device for authentication purposes. In addition or in the alternative, the authentication sensors 150 may comprise a data port, such as a universal serial bus (USB) port, configured to accept data from a connected device for authentication purposes. The authentication sensors 150 may be internal to the telephone 100 and/or may be external and connected to the telephone 100, for example connected via an Electronic Industries Association (EIA) Recommended Standard (RS)-232 serial connector, an Institute of Electrical and Electronics Engineers (IEEE) 1284 parallel connector, a USB version 2.0-3.0 connector (e.g. Type A, Type B, Mini A, Mini B, Micro A, and/or Micro B), an IEEE 1394 Firewire connector, a Modular connector (e.g. Registered Jack (RJ)-11 4 pin, 6 pin, or 8 pin connector, RJ-12 6 pin connector, and/or RJ-45 8 pin connector, etc.), or a Personal Computer Memory Card International Association (PCMCIA) card.

The telephone 100 may comprise communication settings, which may be configurable settings that allow the telephone 100 to operate as a communication device in a network. The communication settings may be configured to be general in nature, which may allow any user to access basic services, or specific to a particular user. The telephone 100 may employ a default configuration, as discussed below, when the telephone 100 is not configured for a particular user. The processor 120 may update the communication settings to cause the telephone 100 to function in a predetermined manner that is appropriate for a specific user. For example, updating the communication settings may comprise receiving a telephone line assignment, speed dials, service links, incoming calls, voicemail, dial permissions, call forwards, call history, and/or extensible markup language (XML) applications that are associated with the user. The processor 120 may update the communication settings to accommodate different users as they are authenticated and may transition back to a default configuration when all users have logged out of the telephone 100.

Figure 2:
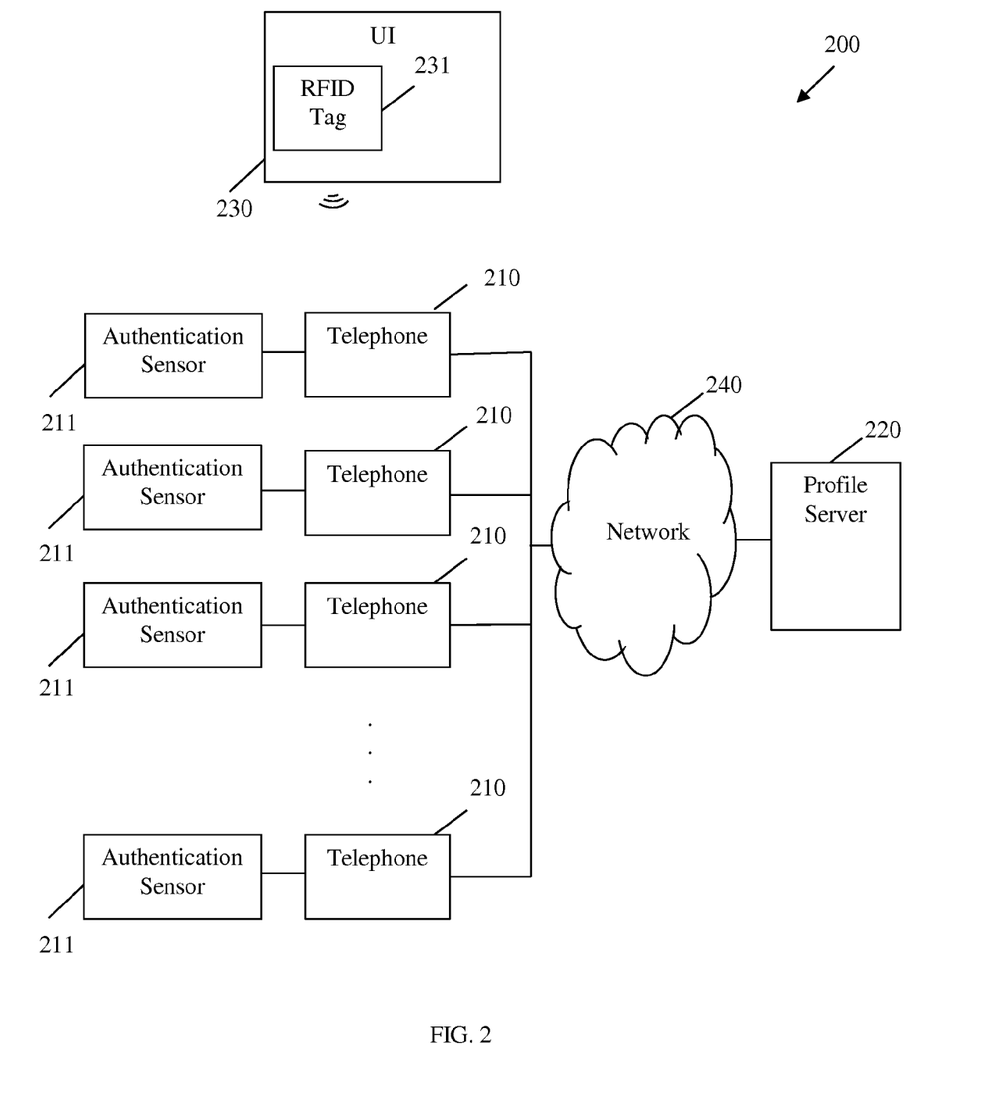
FIG. 2 is a schematic diagram of an embodiment of a telephone network.

FIG. 2 is a schematic diagram of an embodiment of a telephone network 200. The telephone network 200 may comprise a plurality of telephones 210, which may be substantially similar to telephone 100. In addition or in the alternative, the telephones may be wireless telephones, laptops, tablet personal computers, and/or any device configured to send and receive voice/audio data. The telephones 210 may comprise and/or may be coupled to authentication sensors 211 which may be substantially similar authentication sensors 150. The authentication sensors may be internal (e.g. authentication sensors 150), external (e.g. authentication sensors 211), or combinations thereof. Authentication sensors 211 may be permanently coupled to telephones 210, may be removable, or combinations thereof. Also, the telephones 210 may each be coupled to at least one profile server 220 via a network 240.

The network 240 may be any network capable of transmitting voice and/or other data to and from a telephone 210 to other telephones, servers, computer systems or devices. The network may be an Ethernet or IP network, such as a local area network (LAN), wide area network (WAN), Wireless LAN (WLAN), an Institute of Electrical and Electronics Engineers (IEEE) 802.11 WLAN (WiFi) network, metropolitan area network (MAN), virtual LAN (VLAN), the Internet, or other network.

The profile server 220 may be any device or a network server capable of routing voice and other data to and from telephones 210 and/or configuring the telephones for telephone users. For example, a profile server 220 may be assigned a plurality of telephone numbers, and may in turn assign the numbers to a telephone 210. Telephone calls made using the numbers assigned to the profile server may be routed to the profile server 220 for further routing. The profile server 220 may maintain a routing table for use in routing each call to the corresponding telephones 210. The profile server 220 may alter the routing table to reassign telephone numbers amongst the telephones 210. The profile server 220 may also store user profile data, which may be data that specifies the preferred functionality of a telephone 210 when an associated user is logged into the telephone 210. For example, a particular user may be associated with a particular telephone number, and such association may be stored as user profile data. Other telephone features may be associated with a user and stored as user profile data such as a user's authentication data, speed dials, service links, voice mail, dial permissions, conference call access, call forwarding, call history, XML applications, and other applications/data. The profile server 220 may store user profile data, modify user profile data, and transmit user profile data to the telephones 210 as needed and/or upon request.

The telephone network 200 may further comprise a UI 230. A UI 230 may be any device that identifies a particular user. For example, the UI 230 may be a mobile telephone, such as a smart phone, a mobile computer, a tablet computer, an identification (ID) card/badge (e.g. a photo ID badge used to gain admittance to secured areas such as an employee ID badge), a USB based or other electronic key, or other device associated with a particular user. The UI may also be a software component operating on a hardware component, for example a telephony application operating on a smart phone. The UI 230 may employ Near Field Communications (NFC) technology and may comprise Radio-frequency identification (RFID) tag for interfacing with authentication sensors 211. The RFID tag may operate at about 13.56 megahertz (MHz) with interface rates ranging from about 106 kilobits per second (kbit/s) to about 424 kbit/s. The UI 230 may be passive and provide a signal when in close proximity to authentication sensors 211, and/or may be configured to actively send an RFID signal. The RFID signal may comprise user information which may be received an authentication sensor 211 connected to a telephone 210. The user information may comprise data specific to a user that may be used by the telephone network 200 to identify and/or authenticate the user. If NFC technology is employed, the RFID signal comprising the user information may be sent in NFC Data Exchange Format (NDEF). If the UI 230 is a powered device, such as a mobile telephone, the RFID tag 231 may either constantly transmit the RFID signal or transmit the RFID upon the completion of certain predetermined conditions, such as based on user interaction, global positioning (GPS) location, time of day, etc. If the UI 230 is an unpowered device, such as an ID card/badge, the RFID tag 231 may be configured to transmit the RFID signal upon receiving power by being moved into close proximity to authentication sensors 211. The RFID tag 231 may be connected to wire coil that may power the RFID tag 231 when the RFID 231 tag is in motion.

When interacting with telephone network 200, a user may place a UI 230 with a transmitting RFID tag 231 in close proximity to an authentication sensor 211. For example, an NFC tag may be placed within about five centimeters of an NFC sensor to allow the NFC sensor to receive the NDEF message. The telephone 210 connected to the authentication sensor 211 may receive the user information from the UI signal and transmit the user information to the profile server 220 via the network 240 for authentication. The profile server 220 may alter its routing table to assign a telephone number associated with the user to the telephone 210 and transmit user profile data to the telephone 210. The telephone 210 may then update communication settings by configuring the telephone 210 to employ the user profile data. Depending on the implementation, the profile server 220 may require the telephone 210 to collect additional biometric information from the user for authentication purposes prior to transmitting the user profile data. Also, the profile server 220 may require the entry of security data such as a password, PIN, or biometric data via an input device and/or authentication sensor for further authentication 211.

Telephone network 200 may comprise a single network or multiple connected networks. For example, telephone network 200 may be limited to a single building and/or building complex. In addition or in the alternative, network components of telephone network 200 may be spread between multiple locations that are geographically remote from each other. For example, one or more telephones 210 may be positioned in a location in a first city/country/continent, one or more telephones 210 may be positioned in a location in a second city/country/continent, and a profile server 220 may be positioned in a location in a third city/country/continent, or combinations thereof. Telephone network 200 may comprise multiple profile servers 220 as needed for a given implementation. Regardless of the location of the telephones 210, authentication sensors 211, and profile server(s) 220, the network 200 may require that the UI 230 be placed in close proximity to telephone 210 and/or coupled authentication sensor 211 to allow a user to login to that telephone 210.

Figure 3:
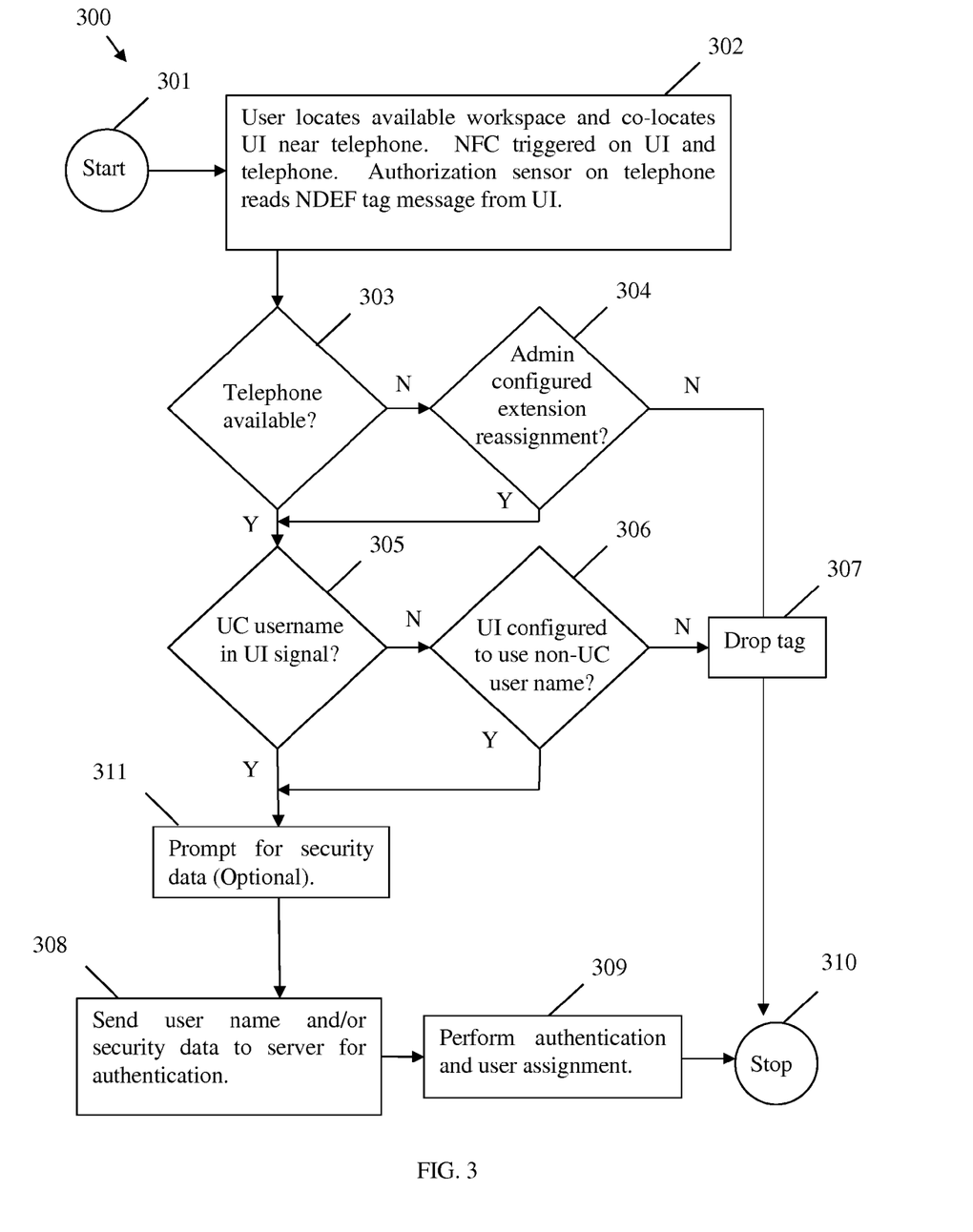
FIG. 3 is a flowchart of an embodiment of a method of transmitting user profile data to a telephone.

FIG. 3 is a flowchart of an embodiment of a method 300 of transmitting user profile data to a telephone, for example telephones 100 and 210. The method 300 may start at block 301 with a user entering a facility that employs components that are substantially similar to telephone network 200. At block 302, the user may locate a workspace with a telephone and place a UI (e.g. a RFID tag or a NFC tag) in close proximity to the telephone's authorization sensor. The receipt of the UI signal from the UI may initiate a communication protocol (e.g. an NFC protocol) at the telephone and optionally at the UI, which may result in a multi-signal exchange in certain embodiments. The authorization sensor may accept an UI signal (e.g. comprising a NDEF message) from the UI and the method may proceed to block 303 where a determination is made as to whether the telephone is available. At block 303, the method may proceed to block 304 if the telephone is not available (e.g. the telephone is not booted up and/or operational) or to block 305 if the telephone is available.

Figure 5:
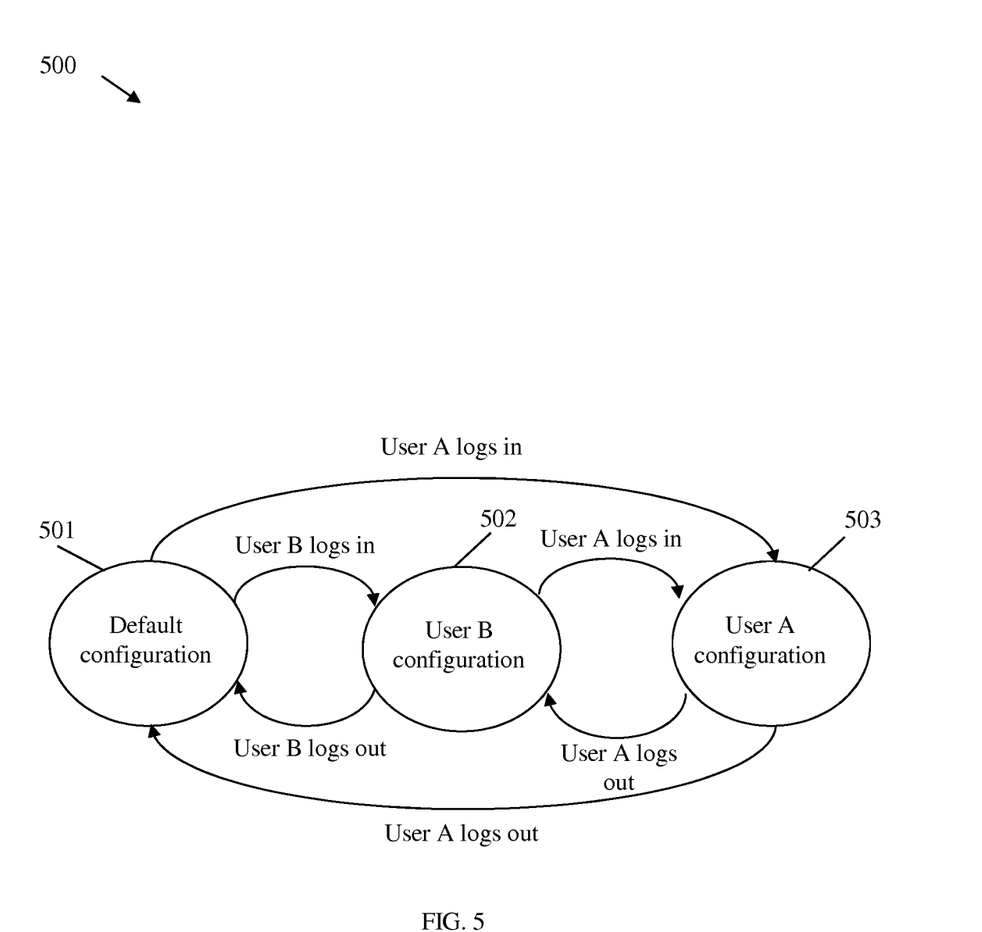
FIG. 5 is an embodiment of a user login state diagram for a telephone.

At block 304 the telephone may determine if the telephone is configured to allow extension reassignment. Extension reassignment may allow a user to login and configure a telephone even if another user is already logged into the telephone. If extension reassignment is allowed, a user that is already logged into the telephone may be temporarily logged out and the telephone may accept the new user's profile data (e.g. see state diagram 500 below). The previous user may be automatically logged back in once the new user logs out. Extension reassignment may be allowed, allowed for certain users, or disallowed by information technology (IT) policy related to the network. In addition or in the alternative, a user may be allowed to prevent extension reassignment on a per session basis or on a permanent basis by selecting a no extension reassignment option that may be stored in the telephone, in that user's profile data, or combinations thereof. If extension reassignment is allowed, the method may proceed to block 305. If extension reassignment is not allowed at block 304, the user may not use the telephone while it is configured for another user. In that case, the method proceeds to block 307 where it drops the tag message and proceeds to block 310. At block 310, the method 300 desists further attempts to configure itself for the user.

Upon reaching block 305, the telephone is aware that updating communication settings is possible if the user is successfully authenticated. At block 305, the telephone may determine whether the UI signal comprises a unified communications (UC) username (e.g. in the NDEF message). The method may proceed to block 306 if the UI signal does not comprise a UC username or to block 308 (or optional block 311) if the UI signal does comprise a UC username. At block 306, the telephone may determine whether the UI is configured to use a non-UC username. If the UI is not configured for user authentication (e.g. the UI signal does not comprise a non-UC username), the user may not login and the telephone may proceed to block 307 and drop the tag message. If at block 306 the UI is configured for user authentication (e.g. the UI signal comprises a non-UC username), the method 300 may proceed to block 308 or optional block 311, depending on the network requirements.

Upon reaching block 311/308, the telephone has determined the UI signal comprises a username (e.g. either UC or non-UC). At block 311, the telephone may prompt the user for security data which may be data used to authenticate a user's identity, such as a password, PIN, biometric data, and/or other authorization data if required by the network. The method 300 may then proceed from optional block 311 to block 308. The telephone may then transmit the username and any authentication information to the profile server at block 308. At block 309, the profile server may receive the username and any authentication information and perform an associated authentication. If the authentication is successful, the routing table may be updated to assign a telephone number associated with the user to the telephone. The profile server may also transmit user profile data to the telephone and proceed to block 310 and stop. If authentication is not successful, the profile server may return an error to the telephone. If authentication is successful, the telephone may update communication settings based on the user profile data.

Figure 4:
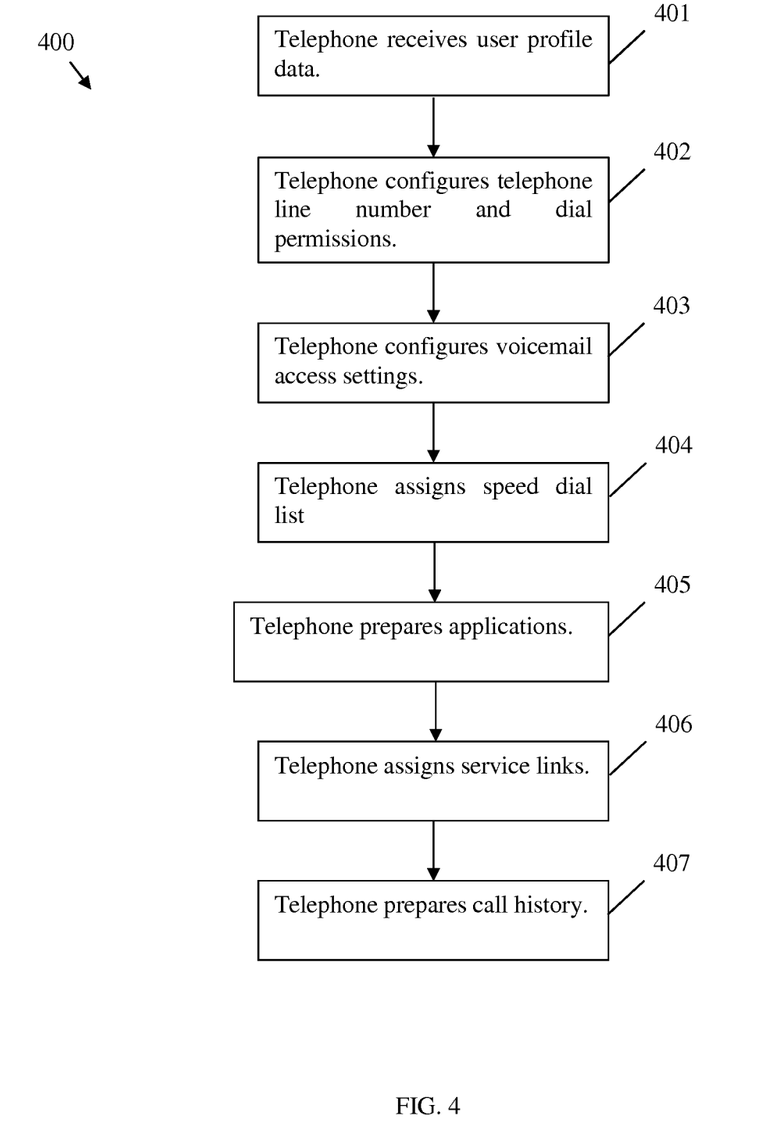
FIG. 4 is a flowchart of an embodiment of a method of updating the communication settings of a telephone.

FIG. 4 is a flowchart of an embodiment of a method 400 of updating the communication settings of a telephone, such as telephone 100 and/or 210. At block 401, the telephone may receive user profile data related to a user (e.g. from a profile server 220). Upon receiving the user profile data, at block 402 the telephone may configure itself to send and receive telephone calls using the telephone number assigned to the user, set the users dial permissions, and proceed to block 403. At block 403, the telephone may configure the user's voicemail settings, which may allow the user to receive any personalized voicemail stored by on the network, change voicemail greetings, etc. At block 404, the telephone may configure the user's speed dial list by assigning specific keyboard buttons and/or menu buttons to automatically dial numbers as listed in the user profile data. At block 405, the telephone may install any applications related to the user and either execute the applications or prepare them to execute based on user input. At block 406, the telephone may assign any service links to specific keyboard buttons and/or menu buttons, which may allow the user to automatically dial a number and/or send data to a specific network component upon selecting the associated button and/or menu item. At block 407, the telephone may prepare to display the user's call history upon request. The telephone may then wait on user input to take further action. It should be noted that any of blocks 402-407 may be removed or performed in an alternate order.

FIG. 5 is an embodiment of a user login state diagram 500 for a telephone, for example telephones 100 and 210. The telephone may be at state 501 when no user is logged in and may comprise a default configuration. Default configuration may be pre-determined by system administration. For example, default configuration may allow only emergency calls, only in system calls, only local calls, only collect calls, access to conference calls, etc. Additional features may be extended or denied to users of telephones in the default configuration as desired by system administration.

The telephone may transition from state 501 to state 502 if user B logs in and state 503 if user A logs in, respectively. The telephone may be configured for user B at state 502 and user A at state 503, respectively. If the telephone is in state 502 (e.g. user B is logged in) the telephone may proceed to state 501 if user B logs out or state 503 if user A logs in without a logout from user B, respectively (e.g. if extension reassignment is allowed). If the telephone is in state 503, the telephone may return to state 502 if the transition to state 503 was accomplished without logging user B out at state 502. Otherwise, a logout at state 503 may return the telephone to state 501. The state transitions discussed hereinabove may be completed by updating the communication settings of the telephone.

In addition, the telephone/profile server may be equipped with an auto logout procedure, which may allow a profile server to send an auto logout message and/or a default configuration to the telephone and cause the telephone to transition to default state 501 from states 502-503. In addition and/or in the alternative, the default configuration may be stored on the telephone, the telephone may cause the state transition, and/or the telephone may inform a profile server of the transition. Auto logout may be applied to a particular user, classes of users (e.g. part time employees, all non-management, etc.), and/or to all users. For example, a profile server may send a default configuration to the telephone and cause a transition to state 501 upon request by a system administrator. As another example, the telephone may transition to state 501 if the telephone has been inactive or has not received a UI signal for a predetermined period of time. In this example, the profile server may control the auto logout procedure by receiving massages from the telephone indicating activity by the user and may transmit the auto logout message when no activity messages related to the user are received for a predetermined period of time. As another example, the telephone may transition to state 501 based on time of day (e.g. transition to state 501 at about 5:00 pm). As another example, the telephone may transition to state 501 (and/or back to a state related to another user if the current state was reached via extension reassignment) based on time of day and based on user profile data (e.g. auto logout a user at the predetermined end of that user's workday). As another example, the telephone may transition back to a previous user state after a predetermined period of time (e.g. extension reassignment revoked after about fifteen minutes, thirty minutes, an hour, etc.) As yet another example, the telephone may transition to a default state after a predetermined period of time (e.g. after four hours, five hours, etc.). The telephone may be equipped with options to postpone and/or prevent auto logout based on user input. The user may be prompted for such input prior to auto logout. In addition or in the alternative, the user may configure the telephone to prevent auto logout for a particular session and or permanently. Such configuration settings may be stored in the telephone and/or in the user's profile data. In yet another embodiment, the profile server may maintain data indicating whether a user is logged into a first telephone, and may send an auto logout message to the first telephone if the user logs into a second telephone.

Figure 6:
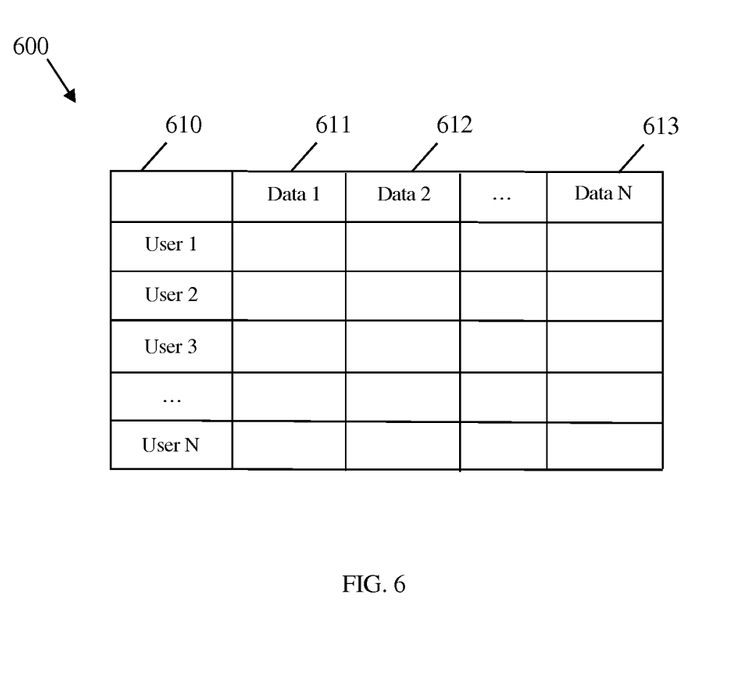
FIG. 6 is a schematic diagram of an example embodiment of a table for storing user profile data.

FIG. 6 is a schematic diagram of an example embodiment of a table 600 for storing user profile data. Table 600 may be maintained on a profile server such as profile server 220. Table 600 may comprise a plurality of columns identifying users the may access a telephone network such as telephone network 200. The user identification data may by a UC username, a non-UC username, or other user identification date. The table 600 may comprise a plurality of columns 611-613 that comprise data related to each user. For example, data columns 611-613 may comprise information needed to administer the network and/or user profile data such as authentication information, telephone call routing information such as telephone number assignments and/or current IP addresses, information indicating whether a given user is currently logged in to the network, user dial permissions, and/or call forwarding information. Data columns 611-613 may also comprise information that is related to user experience such as a user's configured speed dial list, service links related to the user, voicemail data, call history, and/or extensible markup language (XML) applications and/or other software applications that are associated and/or configured by a particular user. Data columns 611-613 may comprise additional columns as needed to store sufficient types of user profile data.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystem shaders, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a transmitter;
a receiver; and
a processor coupled to the transmitter and the receiver, wherein the apparatus comprises communication settings not associated with a user, and wherein the processor is configured to:
receive user information associated with the user;
cause the user information to be transmitted via the transmitter to a profile server for authentication;
receive a personal identification number (PIN) from the user and cause the transmitter to transmit the PIN to the profile server for authentication;
receive user profile data associated with the user from the profile server; and
update the communication settings to include the user profile data; and
an authentication sensor coupled to the processor,
wherein the user information is received by the processor from a user identifier (UI) via the authentication sensor,
wherein the UI comprises a mobile telephone,
wherein the authentication sensor is configured to receive biometric data from the user,
wherein the transmitter is configured to transmit the biometric data to the profile server for authentication,
wherein the apparatus further comprises a telephone,
wherein the user profile data is associated with a user telephone number,
wherein updating the communication settings to include the user profile data allows incoming telephone calls placed to the user telephone number to be routed to and received by the apparatus for presentation to the user,
wherein the receiver is configured to receive an auto logout message from the profile server when the user logs into a remote telephone not attached to the apparatus, and wherein the processor is further configured to prevent telephone line extension reassignment to a second telephone number associated with a second user while a first user is logged in to the apparatus based on the user profile data.

2. The apparatus of claim 1, wherein the authentication sensor comprises an Radio Frequency Identification (RFID) sensor.

3. The apparatus of claim 1, wherein the authentication sensor comprises a near field communication (NFC) sensor.

4. The apparatus of claim 3, wherein the user information comprises a username but not a password.

5. The apparatus of claim 1, wherein the UI further comprises an identification badge.

6. The apparatus of claim 1, wherein the processor is further configured to update the communication settings to remove the user profile data upon receiving the auto logout message.

7. The apparatus of claim 6, wherein a second auto logout message is received at a predetermined time of day based on network permissions of a second user.

8. The apparatus of claim 6, wherein a second auto logout message is received after a predetermined period of inactivity of a second user.

9. The apparatus of claim 1, wherein the user profile data comprises the user telephone number, a user speed dial list, user call permissions, a user call history, user voicemail data, user extensible markup language (XML) application data, user service link data, or combinations thereof.

10. The apparatus of claim 1, wherein the processor is further configured to perform telephone line extension reassignment to a third telephone number associated with a third user while a first user is logged in to the apparatus based on user profile data by:
- causing user information associated with the third user to be transmitted via the transmitter to the profile server for authentication;
- receiving user profile data associated with the third user from the profile server; and
- updating the communication settings to include the user profile data associated with the third user and not user profile data associated with the logged in first user.

11. The apparatus of claim 1, wherein the apparatus is further configured to prompt the user for security data prior to updating the communication settings.

* * * * *